H. V. FLICKINGER.
EGG TURNING TRAY FOR INCUBATORS.
APPLICATION FILED JAN. 16, 1920.
1,361,038.
Patented Dec. 7, 1920.
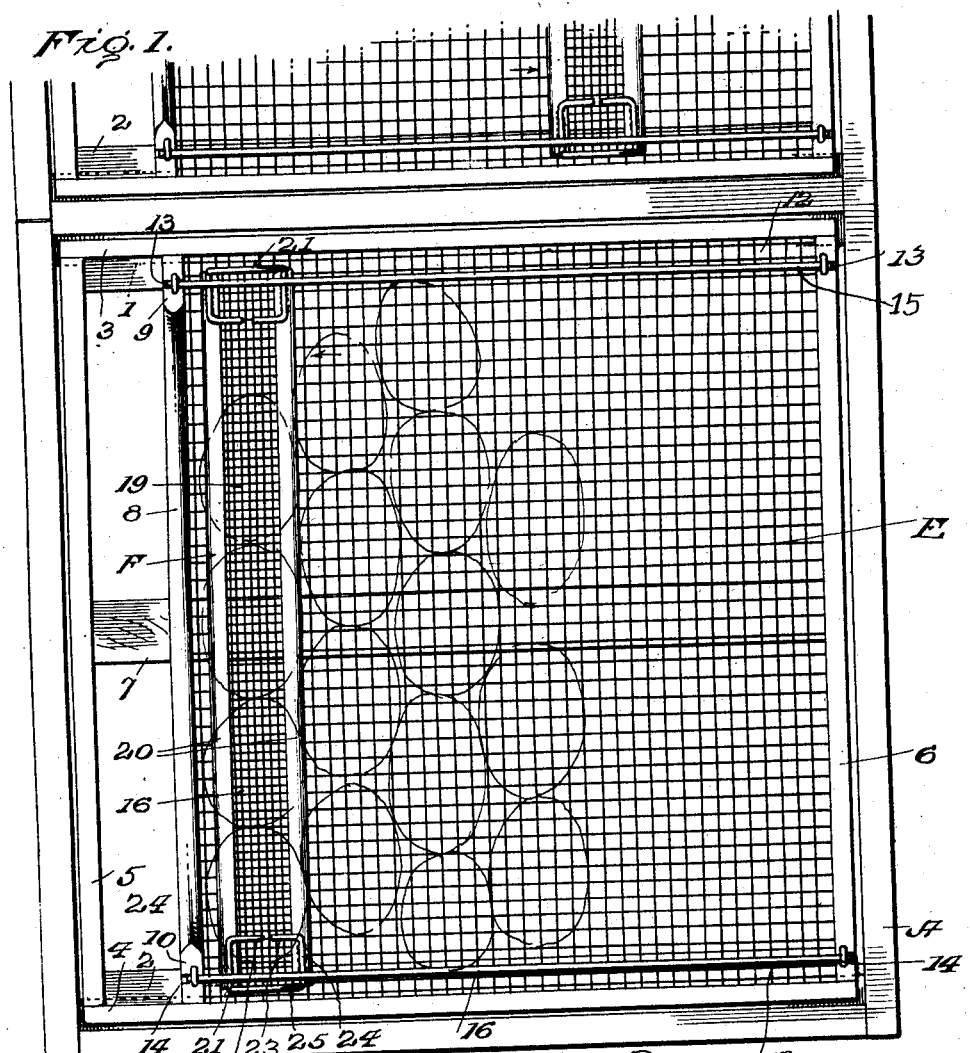
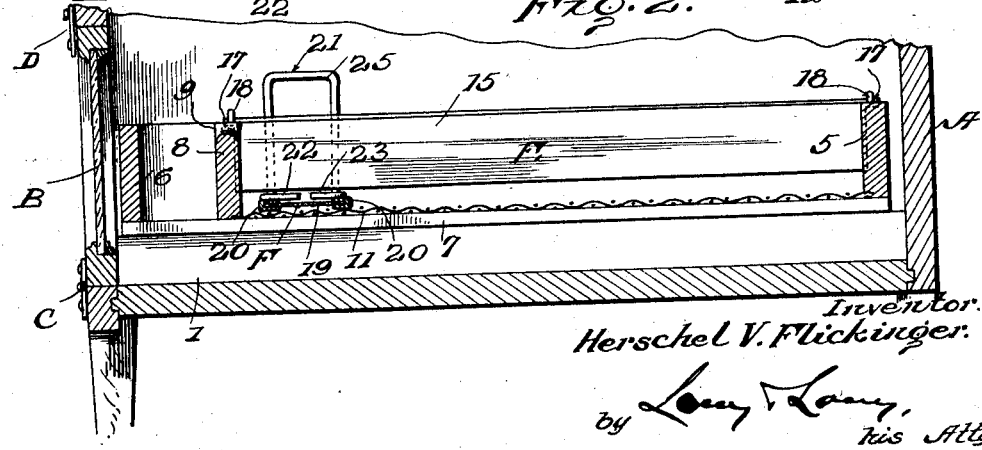
Inventor:
Herschel V. Flickinger.
by Loury & Loury,
his Atty's.

UNITED STATES PATENT OFFICE.

HERSCHEL V. FLICKINGER, OF BUCYRUS, OHIO.

EGG-TURNING TRAY FOR INCUBATORS.

1,361,038.　　　　Specification of Letters Patent.　　Patented Dec. 7, 1920.

Application filed January 16, 1920. Serial No. 351,831.

*To all whom it may concern:*

Be it known that I, HERSCHEL V. FLICKINGER, a citizen of the United States, residing at Bucyrus, in the county of Crawford and State of Ohio, have invented certain new and useful Improvements in Egg-Turning Trays for Incubators, of which the following is a specification.

This invention relates to an egg turning tray for incubators. In hatching eggs in an incubator it is customary for the operator of the incubator to periodically turn the eggs in order that all sides may be as evenly heated as would be the case if the eggs were under a sitting hen. In order to accomplish this result various means have been suggested such as turning the eggs by hand and even elaborate mechanical devices have been devised for automatically accomplishing this effect.

However, it is the object of the present invention to provide a simple device for rolling or turning the eggs in the tray of the incubator without danger of breaking the same, and which may be provided at relatively low cost when the incubator is already in use.

A further object of the invention is to so construct the device that it offers no obstruction to the circulation of air around the eggs.

In the drawings,

Figure 1 is a top plan view of an incubator frame having a tray provided with the invention resting therein, and Fig. 2 is a central vertical section.

In detail the invention, as herewith shown, comprises an incubator frame A of any suitable construction having a door B hinged at C and latched at D. Adjacent the bottom of the frame A are ribs 1 and 2 located on opposite sides of said frame to form a support for the tray E which is removably fitted in the frame A. The tray E is of rectangular form having sides 3, 4, 5 and 6, said sides 5 and 6 being connected by a brace 7. A vertical rib 8 extends parallel to the side 6 and is suitably joined to the side members 3 and 4 and is shaped as shown in cross section in Fig. 2 with the ends 9 and 10 rising to the same height as the side members 6. The bottom of the tray is covered by a reticulated member 11 held in place on the sides 3 and 4 by means of strips 12 extending along the members 3 and 4 between the members 5 and 6. However, the reticulated bottom 11 does not extend the full length of the tray but terminates at the member 8.

Extending parallel with the sides 3 and 4 and mounted in notches 13 and 14 on the members 6 and 8 respectively are the vertical guides 15 and 16, said guides having tongues 17 which are held beneath fastening means 18 in such manner that they may be easily removed if desired.

The egg rolling member is indicated at F and comprises a strip 19 of reticulated material similar to that forming the bottom 11 of the tray but bound on opposite edges by the U-shaped binding members 20 which prevent any sharp wire ends from being presented for contact with the eggs to be turned. The ends of the slide or egg rolling member F are equipped with handles 21, each of which comprises inturned ends 22 and 23 secured to the strip F and extending toward the ends of the strip, as shown at 24, along the surface of the binding members 20 to which they are secured by solder or in any other suitable manner; and finally being bent upwardly at right angles to form a U-shaped handle member 25 which lies between the sides of the tray and the guide members, so that in addition to serving as a reinforcing means for the slide they also serve as a means for moving said slide and guiding the same.

It is to be understood, of course, that the showing in Fig. 1 is to indicate that any number of trays having slides F may be located in an incubator foundation or frame.

Having thus described the invention, what is claimed is:

1. The combination with a relatively fixed egg tray, of guides on said tray, and an egg-turning member traveling beneath the eggs to turn the same and having handles extending above and coöperating with said guides to effect travel of said turning member in a rectilinear path over the bottom of the tray and beneath the eggs.

2. The combination with a relatively stationary egg tray, of parallel guides on said tray, an egg-turning member of reticulated material arranged to travel beneath the eggs to turn the same, and handles rising from and reinforcing the reticulated material and extending past said guides to coöperate therewith whereby the turning member may be moved across the tray in a rectilinear path.

3. The combination of an egg tray, vertically disposed guide strips on said tray, and an egg-turning member consisting of a narrow strip of reticulated material extending under the guides transverse thereto, and handles for moving the turning member rising from the ends of the same between the guide strips and the sides of the tray to coöperate with the guide strips.

In testimony whereof I affix my signature.

HERSCHEL V. FLICKINGER. [L. S.]